(12) United States Patent
Yamashita et al.

(10) Patent No.: US 6,372,688 B1
(45) Date of Patent: Apr. 16, 2002

(54) CATALYST FOR PURIFYING AN EXHAUST GAS AND PROCESS FOR PRODUCING THE SAME

(75) Inventors: Kouichi Yamashita, Minamiaizu-gun; Shinji Tsuji, Numazu, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/455,453

(22) Filed: Dec. 6, 1999

(30) Foreign Application Priority Data

Dec. 28, 1998 (JP) ............................................ 10-347597

(51) Int. Cl.[7] ........................... B01J 23/40; B01J 23/42; B01J 23/58; B01J 23/56; B01J 21/04
(52) U.S. Cl. ................... 502/326; 502/327; 502/328; 502/332; 502/334; 502/339; 502/439; 502/524; 502/527.15
(58) Field of Search ................... 502/326, 327, 502/328, 332, 334, 339, 340, 355, 439, 524, 527.15; 423/22, 111, 155, 213.5

(56) References Cited

U.S. PATENT DOCUMENTS

| 3,969,425 A | * | 7/1976 | Hayes ..................... 260/666 R |
|---|---|---|---|
| 4,115,252 A | * | 9/1978 | Antos ......................... 208/139 |
| 4,233,186 A | * | 11/1980 | Duprez et al. .......... 252/466 B |
| 4,261,862 A | | 4/1981 | Kinoshita et al. |
| 4,274,981 A | * | 6/1981 | Suzuki et al. ................ 252/438 |
| 4,419,274 A | * | 12/1983 | Sin et al. ..................... 502/304 |
| 5,439,865 A | | 8/1995 | Abe et al. |
| 5,906,959 A | * | 5/1999 | Yamasita et al. ............ 502/328 |
| 6,136,451 A | * | 10/2000 | Warnes et al. ............... 426/610 |

FOREIGN PATENT DOCUMENTS

| DE | 3832268 A1 | 4/1989 |
|---|---|---|
| EP | 0 754 494 A2 | 1/1997 |
| GB | 1 468 370 | 5/1980 |
| JP | A 62-277150 | 12/1987 |
| JP | A 9-248458 | 9/1997 |
| JP | A 10-358 | 1/1998 |

OTHER PUBLICATIONS

English Abstract of JP–A–10–202103 (Aug., 1998).

* cited by examiner

*Primary Examiner*—Steven P. Griffin
*Assistant Examiner*—Cam N. Nguyen
(74) *Attorney, Agent, or Firm*—Oliff & Berridge, PLC

(57) ABSTRACT

A catalyst for purifying an exhaust gas includes a composite oxide support and a platinum structural layer. The composite oxide support has a spinel structure expressed by $M.Al_2O_4$ in which M is an alkaline-earth metal. The platinum structural layer is formed on a surface of the composite oxide support and includes a matrix composed mainly of an alkaline-earth metal oxide in which platinum clusters are dispersed uniformly. A composite oxide layer can be interposed between the composite oxide support and the platinum structural layer. Also disclosed is an optimum process for producing the catalyst.

9 Claims, 5 Drawing Sheets

1 COMPOSITE OXIDE SUPPORT PARTICLE ($MgAl_2O_4$)

2 PLATINUM STRUCTURAL LAYER

Ba5-Pt/MgAl2O4

CATALYST FOR PURIFYING AN EXHAUST GAS AND PROCESS FOR PRODUCING THE SAME

BACKGROUND OF THE INVENTION

1. Field of the Invention

The present invention relates to a catalyst for purifying an exhaust gas and a process for producing the same. More particularly, it relates to a catalyst for purifying an exhaust gas, catalyst which is inhibited from deteriorating the purifying performance even when it is used at elevated temperatures in lean atmospheres, and a process for producing the same.

2. Description of the Related Art

Conventionally, a noble metal, such as platinum (Pt), rhodium (Rh) and palladium (Pd), is used as a catalyst component in a catalyst for purifying an exhaust gas, catalyst which is disposed in an exhaust system of an automobile. These noble metals are loaded on an oxide support, such as alumina ($Al_2O_3$), to use. Among them, Pt is more abundant than Rh as a resource, and exhibits a higher catalytic activity than Pd. Accordingly, Pt is utilized mainly in a catalyst for purifying an exhaust gas for an automobile.

However, Pt is oxidized at elevated temperatures in lean atmospheres, is subjected to granular growth, reduces the specific surface area, and consequently its catalytic activity degrades sharply. Recently, the performance of engine has been improved, the chances of high-speed driving have been increased, and further the exhaust-gas regulation has been strengthened. As a result, the temperature of the exhaust gas tends to increase more and more. Hence, it has been desired strongly to develop means for suppressing the granular growth of Pt.

Therefore, the applicant of the present invention proposed in Japanese Unexamined Patent Publication (KOKAI) No. 62-277,150 proposed a catalyst which utilizes a perovskite-type composite oxide which is composed of Pt and a lanthanide element or an alkaline-earth element. In accordance with this catalyst, the thermal deterioration and the alloying of Pt are suppressed with respect to the conventional Pt/ $Al_2O_3$ catalyst. Accordingly, the durability of the catalyst is enhanced remarkably.

However, the recent exhaust-gas temperature is considerably high. Even in the catalyst disclosed in Japanese Unexamined Patent Publication (KOKAI) No. 62-277,150, the perovskite-type composite oxide starts degrading thermally in the temperature region exceeding 900° C. Hence, in order to cope with the further heightening of the exhaust-gas temperature in the near future, it is necessary to suppress the granular growth of Pt even in the temperature region exceeding 1,000° C.

Therefore, the inventors of the present invention made a research and development earnestly, and proposed a catalyst in Japanese Unexamined Patent Publication (KOKAI) No. 10-358. The catalyst is made by mixing a powder, comprising a Pt composite oxide, and a γ-$Al_2O_3$ powder. The Pt composite oxide contains Pt and one or more element selected from the group consisting of alkaline-earth elements and group 3A elements in the periodic table of the elements. In accordance with the catalyst, since Pt is taken in into the crystals of the composite oxide and it is stabilized therein, it is possible to achieve a high heat resistance of 1,000° C. or more.

However, even when the catalyst disclosed in Japanese Unexamined Patent Publication (KOKAI) No. 10-358 is used at elevated temperatures in lean atmospheres, it has been revealed that the Pt composite oxide is subjected to the sintering to a certain extent. Accordingly, it has been found that the specific surface area decreases so that the purifying performance degrades.

The present invention has been developed in view of the aforementioned circumstances. It is therefore an object of the present invention to suppress the sintering of the Pt composite oxide by further enhancing the heat resistance of the Pt composite oxide, and to further upgrade the durability by suppressing the granular growth of Pt clusters.

SUMMARY OF THE INVENTION

A first aspect of the present invention carries out the aforementioned objects, and is characterized in that it is a catalyst for purifying an exhaust gas, comprising:

a composite oxide support having a spinel structure expressed by $M.Al_2O_4$ in which M is an alkaline-earth metal; and a platinum structural layer formed on a surface of said composite oxide support and including a matrix composed mainly of an alkaline-earth metal oxide in which platinum clusters are dispersed uniformly.

A second aspect of the present invention is characterized in that it is a catalyst for purifying an exhaust gas, comprising:

a composite oxide support having a spinel structure expressed by $M.Al_2O_4$ in which M is an alkaline-earth metal;

a composite oxide layer formed on a surface of said composite oxide support and containing the M and an alkaline-earth metal other than the M at least; and a platinum structural layer formed on a surface of said composite oxide layer and including a matrix composed mainly of an alkaline-earth metal oxide in which platinum clusters are dispersed uniformly.

A third aspect of the present invention is a process optimum for producing the aforementioned catalysts, and is characterized in that it is a process for producing a catalyst for purifying an exhaust gas, comprising the steps of:

mixing a solution, in which an alkoxide containing an alkaline-earth metal and a platinum compound are solved, with composite oxide support particles having a spinel structure expressed by $M.Al_2O_4$ in which M is an alkaline-earth metal, thereby hydrolyzing the alkoxide; and burning the resulting hydrolyzed products, thereby forming a platinum structural layer on a surface of the composite oxide support particles, the platinum structural layer including a matrix composed mainly of an alkaline-earth metal oxide in which platinum clusters are dispersed uniformly.

Namely, in accordance with the present exhaust-gas purifying catalysts, the coarsening of the Pt clusters can be furthermore suppressed. Accordingly, the present exhaust-gas purifying catalysts can exhibit high purifying performance even after a durability processing in which they are heated at 1,000° C., and are extremely good in terms of the heat resistance.

Whilst, in accordance with the present production process, the aforementioned catalysts having good heat resistance can be produced stably and securely.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
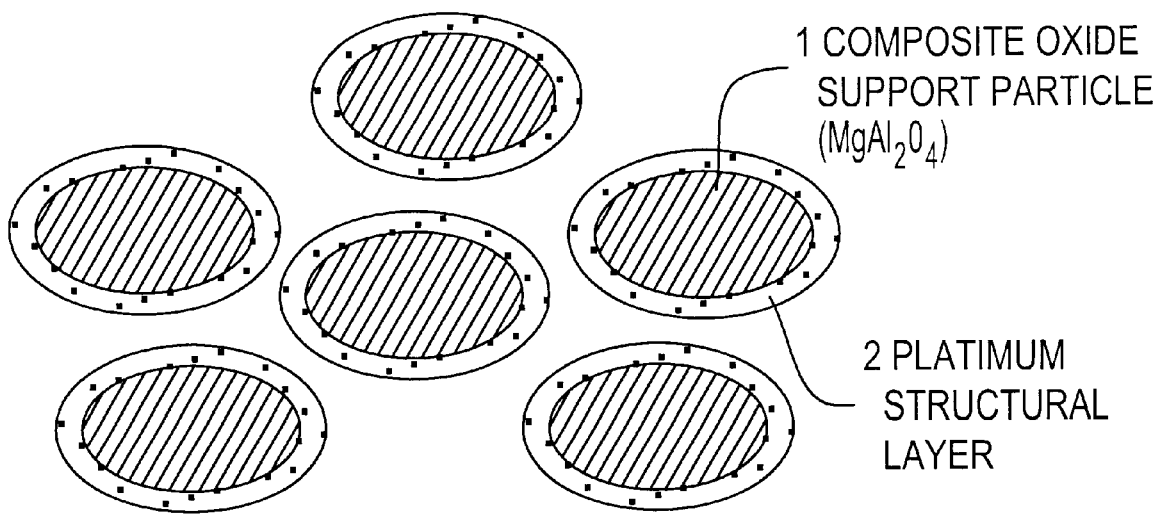
FIG. 1 is a schematic cross-sectional view for illustrating an arrangement of an exhaust-gas purifying catalyst of an example according to the present invention.

Having generally described the present invention, a further understanding can be obtained by reference to the specific preferred embodiments which are provided herein for the purpose of illustration only and not intended to limit the scope of the appended claims.

According to the studies of the inventors of the present invention, the following were found out: the sintering of the Pt composite oxide occurs most greatly when the Pt composite oxide is present independently; the sintering occurs less but greatly when the Pt composite oxide is mixed with an oxide support; and the sintering is suppressed most when the Pt composite oxide is formed on a surface of the oxide support in a laminar manner.

Moreover, it was found out that the oxide support is less likely to react with the Pt composite oxide when the composite oxide support is employed which has a spinel structure expressed by $M.Al_2O_4$ in which M is an alkaline-earth metal. In addition, it was revealed that platinum clusters are extremely stable even at 1,000° C. in a platinum structure which includes a matrix composed mainly of an alkaline-earth metal oxide in which platinum clusters are dispersed uniformly. The present invention has been developed based upon these discoveries.

For instance, in the present exhaust-gas purifying catalyst, the platinum structural layer is formed on a surface of the composite oxide support. The composite oxide support has a spinel structure expressed by $M.Al_2O_4$ in which M is an alkaline-earth metal. The platinum structural layer includes the matrix composed mainly of the alkaline-earth metal oxide in which the platinum clusters are dispersed uniformly. The platinum clusters in the platinum structure is extremely stable even when they were heated at 1,000° C.

An oxide, such as $Al_2O_3$ and $SiO_2$, reacts with the platinum structure at elevated temperatures to generate $SrAl_2O_4$, and the like, for example. Accordingly, the stability of the platinum clusters is low, and the platinum clusters become coarse. Thus, there arises a drawback in that the purifying performance degrades. However, the composite oxide support having a spinel structure expressed by $M.Al_2O_4$ in which M is an alkaline-earth metal element is less likely to react with the platinum structure even at elevated temperatures. Consequently, the platinum clusters are less likely to become coarse.

Furthermore, the sintering of the platinum structure itself can be suppressed by forming the platinum structure in a laminar manner. Accordingly, it is possible to suppress the coarsening of the platinum clusters which results from the sintering of the platinum structure itself.

In the present exhaust-gas purifying catalysts, it is considered that the platinum clusters are inhibited from becoming coarse by the synergetic effects of these operations. Thus, the present exhaust-gas purifying catalysts are extremely good in terms of the heat resistance.

The composite oxide support having a spinel structure is expressed by $M.Al_2O_4$. The alkaline-earth metal M can be at least one member selected from the group consisting of Mg, Ca, Sr and Ba. Among them, it is especially preferable to employ one of Sr and Ba at least. It is more preferable that the composite oxide support exhibits a higher specific surface area. However, it is important that the specific surface area does not vary before and after a durability test. When the specific surface area does not vary before and after a durability test, the composite oxide support fully effects the advantages even when the specific surface area is about 15 $m^2/g$.

The platinum structural layer is constituted by uniformly dispersing the platinum clusters in the matrix composed mainly of an alkaline-earth metal oxide. The alkaline-earth metal can be at least one member selected from the group consisting of Mg, Ca, Sr and Ba.

The platinum structure is a structure which includes the matrix composed mainly of an alkaline-earth metal oxide in which the platinum clusters are dispersed uniformly. The specific composition is unknown, but it is considered as a composite oxide of an alkaline-earth metal and Pt. Concerning the composition of the platinum structural layer, the ratio of alkaline-earth metal with respect to platinum can preferably fall in the range of from 2:1 to 70:1 by a molar ratio. When the platinum clusters are less than the range, no desired purifying activity is obtained. When the platinum clusters are more than the range, the platinum clusters are likely to grow granularly if they are subjected to elevated temperatures.

It is preferred that a particle diameter of the platinum clusters in the platinum structure can be 10 nm or less. When the particle diameter of the platinum clusters is more than 10 nm, the surface area is reduced to decrease the catalytic active sites. Accordingly, no desirable catalytic activity can be obtained. When the particle diameter of the platinum clusters is 10 nm or less, the particle diameter of the platinum clusters can be 10 nm or less even after a durability test is carried out in which the present catalysts are heated at 1,000° C. for 5 hours. Consequently, high purifying performance can be maintained after the durability test.

It is preferred that a thickness of the platinum structural layer can be 0.05 μm or less. It is especially preferred that the thickness can be on the order of primary particles. When the thickness of the platinum structural layer thickens, there arises the sintering of the platinum structure itself unpreferably.

In the present exhaust-gas purifying catalyst according to the second aspect of the present invention, the composite oxide layer is formed between the aforementioned composite oxide support and the platinum structural layer. The composite oxide layer contains the alkaline-earth metal M, which is a constituent element of $M.Al_2O_4$ working as the composite oxide support, and an alkaline-earth metal other than the M. By interposing the composite oxide layer, the adhesion strength between the composite oxide support and the platinum structural layer is improved so that the sintering of the platinum structural layer can be furthermore suppressed.

It is preferred that the alkaline-earth metal other than the M of the constituent element of the composite oxide layer can be identical with the alkaline-earth metal of the constituent element of the platinum structural layer. Thus, the adhesion strength between the composite oxide support and the platinum structural layer is furthermore improved so that the sintering of the platinum structural layer can be moreover suppressed.

It is preferred that a thickness of the composite oxide layer can fill in the range of from 0.02 to 0.1 μm. When the thickness of the composite oxide layer comes out of the range, the adhesion strength between the composite oxide support and the platinum structural layer is not improved desirably.

By the way, the specific surface area of a catalyst is proportional to a number of platinum active sites which are present on the surface of the catalyst. Accordingly, a larger specific surface area is more preferable. In order to increase the specific surface area, it is preferable to employ a fine particle-shaped composite oxide support exhibiting a specific surface area of 15 $m^2/g$ or more as aforementioned, and to form the laminar platinum structural layer on the surface. In order to thus form the laminar platinum structural layer, it is possible to utilize the alkoxide method (or sol-gel method) or the gas-phase decomposition method.

Hence, in the present production process for stably producing the present exhaust-gas purifying catalysts, a solution, in which an alkoxide containing an alkaline-earth metal element and a platinum compound are solved, is first mixed with composite oxide support particles having a spinel structure expressed by $M.Al_2O_4$ in which M is an alkaline-earth metal, and thereby the alkoxide is hydrolyzed. Then, the resulting hydrolyzed products are burned, and thereby the platinum structural layer is formed on a surface of the composite oxide support particles.

In the alkoxide method, an alkoxide is solved in a solvent, such as an alcohol, to prepare a solution. The alkoxide is hydrolyzed and aged to precipitate oxide precursors, i.e., solid hydroxides. Then, the precipitated oxide precursors are burned to form oxides. Therefore, in the present production process, the hydroxides formed by hydrolyzing and aging are precipitated on the surface of the coexisting composite oxide support particles, and they are burned and formed as the laminar platinum structural layer on the surface of the particle-shaped support.

As for the composite oxide support employed in the present production process, it is possible to use the composite oxide support identical with the one used in the present exhaust-gas purifying catalysts. As for the solvent solving the alkoxide, a variety of alcohols can be used independently, or two or more of them can be mixed to use. It is preferred that a mixed solvent of an ether and an alcohol can be used. With this arrangement, the precipitation of Pt acetylacetonate is suppressed during the hydrolysis, and a homogenous gel can be obtained. The kinds and mixing ratios of the ether and alcohol can be selected variously in accordance with the kinds and amounts of the employed alkoxides.

The resulting present catalysts can be pelletized by ordinary methods, and can be put into actual applications as a pelletized catalyst. Moreover, they can be coated on a honeycomb support substrate made of cordierite or metal, and can be put into actual applications as a monolithic catalyst. Thus, they can be used in diverse usages, such as oxidizing catalysts, 3-way catalysts, lean-burn engine catalysts, diesel engine catalysts and $NO_x$ storage-and-reduction type catalysts.

The present invention will be hereinafter described in detail with reference to examples and comparative examples.

EXAMPLE NO. 1

FIG. 1 illustrates a schematic cross-sectional view of a catalyst which was prepared in this example. This catalyst is composed of a composite oxide particle 1 and a platinum structural layer 2. The composite oxide particle 1 comprises $MgAl_2O_4$. The platinum structural layer 2 is formed on the surface of the composite oxide particle 1, and is assumed to have a structure, $Sr_5PtO_7$. A production process of this catalyst will be hereinafter described, and the description substitutes for the detailed description of the arrangement of the catalyst.

75 g of 2-propanol and 25 g of 2-methoxymethanol were mixed. Into the mixed solvent, 3.29 g of $Sr(OC_3H_7)_2$ and 126 g of $Pt(C_5H_7O_2)_2$ were charged. The resulting mixture was stirred under reflux at 80° C. for 12 hours, thereby preparing an alkoxide solution.

Whilst, 75 g of 2-propanol and 25 g of 2-methoxymethanol were mixed. Into the mixed solvent, 47.6 g of commercially available $MgAl_2O_4$ (specific surface area 20 $m^2/g$) was added. The resulting mixture was stirred, and was heated at 80° C., thereby preparing a support dispersion.

Then, into the support dispersion held at 80° C., the aforementioned alkoxide solution held at 80° C. was added. The resulting mixture was held at 80° C., and was stirred under reflux for 1 hour. While stirring the mixture, 0.40 g of deionized water was added. The mixture was again held at 80° C., and was further stirred under reflux for 4 hours, thereby carrying out the hydrolysis and aging.

The resulting dispersion was degreased with an aspirator at 100° C., was thereafter further degreased in $N_2$ at 300° C., and was finally burned at 500° C. for 3 hours. Thus, a catalyst powder of this example was obtained. This catalyst is believed to be constituted by forming the platinum structural layer expressed by $Sr_5PtO_7$ on the surface of the $MgAl_2O_4$ support. The loading amount of Pt was 1.25% by weight.

Figure 2:
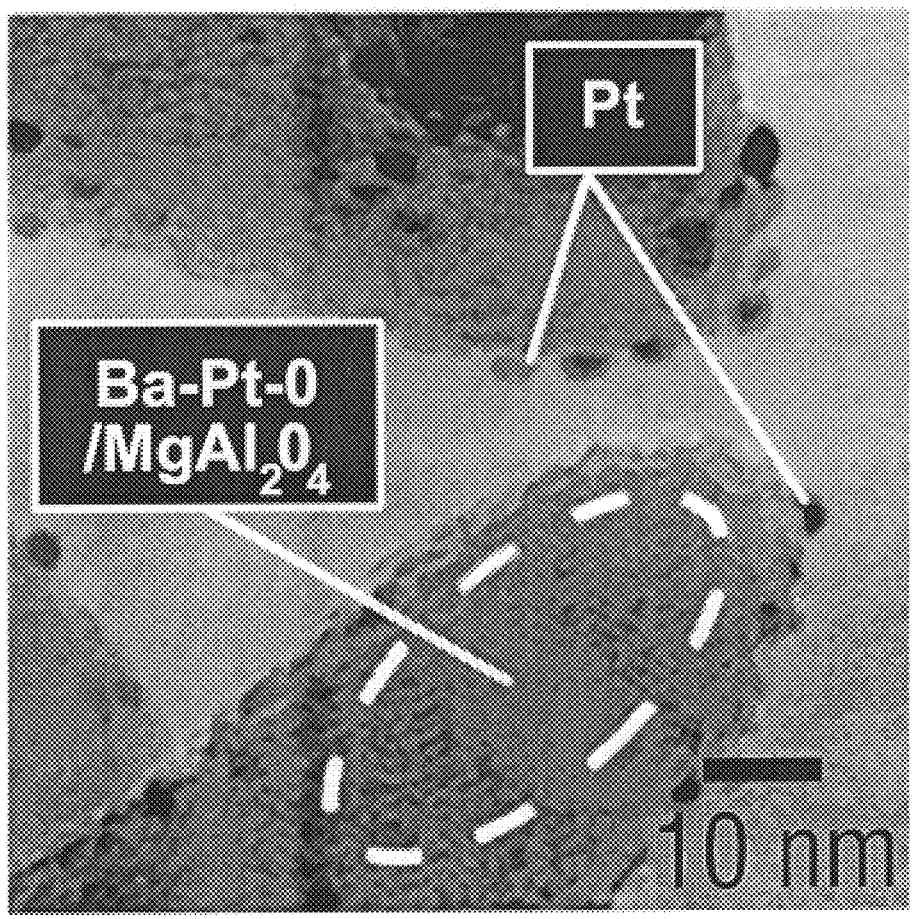
FIG. 2 is an electron microscope photograph for illustrating an initial particulate arrangement of a catalyst of Example No. 2.

An electron microscope photograph of this catalyst is shown in FIG. 2. From FIG. 2, it is apparent that the platinum clusters of less than 10 nm were formed on the surface of the $MgAl_2O_4$ support.

EXAMPLE NO. 2

Except that 4.09 g of $Ba(OC_3H_7)_2$ was used instead of $Sr(OC_3H_7)_2$, a catalyst of Example No. 2 was prepared in the same manner as Example No. 1. This catalyst is believed to be constituted by forming the platinum composite oxide layer expressed by $Ba_5PtO_7$ on the surface of the $MgAl_2O_4$ support. The loading amount of Pt was 1.25% by weight.

EXAMPLE NO. 3

$Sr(OC_3H_7)_2$ and $Al(OC_3H_7)_3$ were used, and $SrAl_2O_4$ was synthesized by the sol-gel method. The final burning conditions were 1,000° C. for 5 hours. The specific surface area of the resulting $SrAl_2O_4$ was 22 $m^2/g$.

Except that 4.09 g of this $SrAl_2O_4$ was used instead of $MgAl_2O_4$, a catalyst of Example No. 3 was prepared in the same manner as Example No. 1. This catalyst is believed to be constituted by forming the platinum composite oxide layer expressed by $Sr_5PtO_7$ on the surface of the $SrAl_2O_4$ support. The loading amount of Pt was 1.25% by weight.

EXAMPLE NO. 4

$Ba(OC_3H_7)_2$ and $Al(OC_3H_7)_3$ were used, and $BaAl_2O_4$ was synthesized by the sol-gel method. The final burning conditions were 1,000° C. for 5 hours. The specific surface area of the resulting $BaAl_2O_4$ was 43 $m^2/g$.

Except that 4.09 g of this $BaAl_2O_4$ was used instead of $MgAl_2O_4$, and except that 4.09 g of $Ba(OC_3H_7)_2$ was used instead of $Sr(OC_3H_7)_2$, a catalyst of Example No. 4 was prepared in the same manner as Example No. 1. This catalyst is believed to be constituted by forming the platinum composite oxide layer expressed by $Ba_5PtO_7$ on the surface of the $BaAl_2O_4$ support. The loading amount of Pt was 1.25% by weight.

EXAMPLE NO. 5

Except that the oxidized state of the loading component was assumed to be $Sr_{60}PtO_{62}$ after the burning so that the charging amounts of the raw materials were adjusted, a catalyst of Example No. 5 was prepared in the same manner as Example No. 1. This catalyst is believed to be constituted by forming the platinum structural layer expressed by $Sr_{60}PtO_{62}$ on the surface of the $MgAl_2O_4$ support. The loading amount of Pt was 1.25% by weight.

EXAMPLE NO. 6

Except that the oxidized state of the loading component was assumed to be $SrPtO_3$ after the burning so that the charging amounts of the raw materials were adjusted, a catalyst of Example No. 6 was prepared in the same manner as Example No. 1. This catalyst is believed to be constituted by forming the platinum structural layer expressed by $SrPtO_3$ on the surface of the $MgAl_2O_4$ support. The loading amount of Pt was 1.25% by weight.

EXAMPLE NO. 7

Except that the oxidized state of the loading component was assumed to be $Sr_{90}PtO_{47}$ after the burning so that the charging amounts of the raw materials were adjusted, a catalyst of Example No. 7 was prepared in the same manner as Example No. 1. This catalyst is believed to be constituted by forming the platinum structural layer expressed by $Sr_{90}PtO_{47}$ on the surface of the $MgAl_2O_4$ support. The loading amount of Pt was 1.25% by weight.

EXAMPLE NO. 8

Except that $Ba(OC_3H_7)_2$ was used instead of $Sr(OC_3H_7)_2$, and except that the oxidized state of the loading component was assumed to be $Ba_{20}PtO_{62}$ after the burning so that the charging amounts of the raw materials were adjusted, a catalyst of Example No. 8 was prepared in the same manner as Example No. 1. This catalyst is believed to be constituted by forming the platinum structural layer expressed by $Ba_{20}PtO_{62}$ on the surface of the $MgAl_2O_4$ support. The loading amount of Pt was 1.25% by weight.

EXAMPLE NO. 9

The oxidized state of the loading component was assumed to be $Sr_5PtO_7/SrMgAl_{0.2}O_{2.3}/MgAl_2O_4$ after the burning so that the charging-and-loading amounts were calculated.

Into 200 g of deionized water, 47.12 g of commercially available $MgAl_2O_4$ (specific surface area 25 $m^2/g$) was charged. Next, 0.6772 g of $Sr(NO_3)_2$, 0.8205 g of $Mg(NO_3)_2 \cdot 6H_2O$ and 0.2400 g of $Al(NO_3)_3 \cdot 9H_2O$ were added and solved into the resulting dispersion. While stirring the dispersion, the dispersion was heated at 100° C. to evaporate the water content Then, the resultant cake was dried at 120° C., and was burned at 800° C. for 3 hours. Thus, a powder was prepared whose $MgAl_2O_4$ particulate's surface was provided with an Sr—Mg—Al composite oxide layer.

Except that the aforementioned powder was used instead of $MgAl_2O_4$, a catalyst of Example No. 9 was prepared in the same manner as Example No. 1. This catalyst is believed to be constituted by forming the Sr—Mg—Al composite oxide layer on the surface of the $MgAl_2O_4$ particulate and further forming the platinum structural layer expressed by $Sr_5PtO_7$ on the surface of the Sr—Mg—Al composite oxide layer. The loading amount of Pt was 1.25% by weight.

EXAMPLE NO. 10

The oxidized state of the loading component was assumed to be $Ba_5PtO_7/BaMgO_2/MgAl_2O_4$ after the burning so that the charging-and-loading amounts were calculated.

Into 200 g of deionized water, 48.66 g of commercially available $MgAl_2O_4$ (specific surface area 25 $m^2/g$) was charged. Next, 0.8363 g of $Ba(NO3)_2$, 0.8205 g of $Mg(NO_3)_2 \cdot 6H_2O$ were added and solved into the resulting dispersion. While stirring the dispersion, the dispersion was heated at 100° C. to evaporate the water content. Then, the resultant cake was dried at 120° C., and was burned at 800° C. for 3 hours. Thus, a powder was prepared whose $MgAl_2O_4$ particulate's surface was provided With a Ba—Mg composite oxide layer.

Except that the aforementioned powder was used instead of $MgAl_2O_4$, a catalyst of Example No. 10 was prepared in the same manner as Example No. 2. This catalyst is believed to be constituted by forming the Ba—Mg composite oxide layer on the surface of the $MgAl_2O_4$ particulate and further forming the platinum structural layer expressed by $Ba_5PtO_7$ on the surface of the Ba–Mg composite oxide layer. The loading amount of Pt was 1.25% by weight.

Comparative Example No. 1

Into 200 g of deionized water, 12.63 g of a dinitrodiammine platinum nitrate aqueous solution was added which contained Pt in an amount of 4.0% by weight by a metallic Pt conversion, and 49.37 g of a $\gamma$-$Al_2O_3$ powder (specific surface area 180 $m^2/g$) was further added. While stirring the resulting dispersion, the dispersion was heated at 100° C. to evaporate the water content Then, the resultant cake was dried at 120° C. for 24 hours, and was thereafter burned in air at 500° C. for 1 hour. Thus, a catalyst powder of Comparative Example No. 1 was obtained.

The catalyst of this Comparative Example No. 1 is believed that Pt was highly dispersed even in the pores of the $\gamma$-$Al_2O_3$ particulates. The loading amount of Pt was 1.25% by weight.

Comparative Example No. 2

Into 200 g of deionized water, 11.32 g of a dinitrodiaimmine platinum nitrate aqueous solution was added which contained Pt in an amount of 4.0% by weight by a metallic Pt conversion, 3.02 g of rhodium nitrate was further added which contained Rh in an amount of 3% by weight by a metallic Rh conversion, and 49.46 g of a $\gamma$-$Al_2O_3$ powder (specific surface area 180 m²/g) was furthermore added. While stirring the resulting dispersion, the dispersion was heated at 100° C. to evaporate the water content. Then, the resultant cake was dried at 120° C. for 24 hours, and was thereafter burned in air at 500° C. for 1 hour. Thus, a catalyst powder of Comparative Example No. 2 was obtained.

The catalyst of this Comparative Example No. 2 is believed that Pt and Rh were highly dispersed even in the pores of the γ-$Al_2O_3$ particulates. The loading amount of Pt was 0.91% by weight, and the loading amount of Rh was 0.18% by weight.

Comparative Example No. 3

Into 200 g of deionized water, 12.63 g of a dinitrodiammine platinum nitrate aqueous solution was added which contained Pt in an amount of 4.0% by weight by a metallic Pt conversion, and 49.37 g of a $MgAl_2O_4$ powder (specific surface area 25 m²/g) was further added. While stirring the resulting dispersion, the dispersion was heated at 100° C. to evaporate the water content. Then, the resultant cake was dried at 120° C. for 24 hours, and was thereafter burned in air at 500° C. for 1 hour. Thus, a catalyst powder of Comparative Example No. 3 was obtained.

The catalyst of this Comparative Example No. 3 is believed that Pt was highly dispersed even in the pores of the $MgAl_2O_4$ particulates. The loading amount of Pt was 1.25% by weight.

Comparative Example No. 4

The oxidized state of the loading component was assumed to be $Sr_5PtO_7$ after the burning so that the charging-and-loading amounts were calculated.

Into 200 g of deionized water, 47.62 g of a commercially available γ-$Al_2O_3$ powder (specific surface area 180 m²/g) was charged. Further, 3.386 g of $Sr(NO_3)_2$ and 15.63 g of a dinitrodiammine platinum nitrate aqueous solution, which contained Pt in an amount of 4.0% by weight by a metallic Pt conversion, were added and solved. While stirring the resulting dispersion, the dispersion was heated at 100° C. to evaporate the water content. Then, the resultant cake was dried at 120° C. for 24 hours, and was thereafter burned in air at 500° C. for 1 hour. Thus, a catalyst powder of Comparative Example No. 4 was obtained.

The catalyst of this Comparative Example No. 4 is believed to be constituted by forming the platinum structural layer expressed by $Sr_5PtO_7$ on the surfaces of the $Al_2O_3$ particulates. The loading amount of Pt was 1.25% by weight.

Comparative Example No. 5

The oxidized state of the loading component was assumed to be $Sr_5PtO_7$ after the burning so that the charging-and-loading amounts were calculated.

Into 200 g of deionized water, 47.62 g of a commercially available $SiO_2$ powder (specific surface area 350 m²/g) was charged. Further, 3.386 g of $Sr(NO_3)_2$ and 15.63 g of a dinitrodiaimmine platinum nitrate aqueous solution, which contained Pt in an amount of 4.0% by weight by a metallic Pt conversion, were added and solved. While stirring the resulting dispersion, the dispersion was heated at 100° C. to evaporate the water content. Then, the resultant cake was dried at 120° C. for 24 hours, and was thereafter burned in air at 700° C. for 1 hour. Thus, a catalyst powder of Comparative Example No. 5 was obtained.

The catalyst of this Comparative Example No. 5 is believed to be constituted by forming the platinum structural layer expressed by $Sr_5PtO_7$ on the surfaces of the $SiO_2$ particulates. The loading amount of Pt was 1.25% by weight.

Comparative Example No. 6

The oxidized state of the loading component was assumed to be $Sr_5PtO_7$ after the burning so that the charging-and-loading amounts were calculated.

Into 200 g of deionized water, 47.62 g of a commercially available $ZrO_2$ powder (specific surface area 49 m²/g) was charged. Further, 3.386 g of $Sr(NO_3)_2$ and 15.63 g of a dinitrodiammine platinum nitrate aqueous solution, which contained Pt in an amount of 4.0% by weight by a metallic Pt conversion, were added and solved. While stirring the resulting dispersion, the dispersion was heated at 100° C. to evaporate the water content. Then, the resultant cake was dried at 120° C. for 24 hours, and was thereafter burned in air at 700° C. for 1 hour. Thus, a catalyst powder of Comparative Example No. 6 was obtained.

The catalyst of this Comparative Example No. 6 is believed to be constituted by forming the platinum structural layer expressed by $Sr_5PtO7$ on the surfaces of the $Zro_2$ particulates. The loading amount of Pt was 1.25% by weight.

Comparative Example No. 7

The oxidized state of the loading component was assumed to be $Ba_5PtO_7$ after the burning so that the charging-and-loading amounts were calculated.

Into 200 g of deionized water, 47.62 g of a commercially available γ-$Al_2O_3$ powder (specific surface area 180 m²/g) was charged. Further, 3.386 g of $Ba(NO_3)_2$ and 15.63 g of a dinitrodiammine platinum nitrate aqueous solution, which contained Pt in an amount of 4.0% by weight by a metallic Pt conversion, were added and solved. While stirring the resulting dispersion, the dispersion was heated at 100° C. to evaporate the water content. Then, the resultant cake was dried at 120° C. for 24 hours, and was thereafter burned in air at 700° C. for 1 hour. Thus, a catalyst powder of Comparative Example No. 7 was obtained.

The catalyst of this Comparative Example No. 7 is believed to be constituted by forming the platinum structural layer expressed by $Ba_5PtO_7$ on the surfaces of the $Al_2O_3$ particulates. The loading amount of Pt was 1.25%o by weight.

Evaluation and Examination

The catalysts of Example Nos. 1 through 10 and the catalysts of Comparative Example Nos. 1 through 7 were pressurized respectively by an ordinary-temperature hydrostatic-pressure pressing machine (CIP). Thereafter, they were pulverized, and were thereby formed into pellet-shaped particles having a diameter of from 1.0 to 1.7 mm. Each of the resulting pelletized catalysts was placed in an ordinary-pressure flow-system durability testing apparatus, and was processed for durability in a durability model gas at 1,000° C. for 5 hours. The composition of the durability model gas is set forth in Table 1, and was equivalent to A/F=16 with $SO_2$ added.

After the durability processing, each of the pelletized catalysts was placed in an ordinary-pressure flow-system reactor testing apparatus in an amount of 2.0 g, respectively, and an evaluation model gas was supplied thereinto at a flow rate of 5 L/min. The composition of the evaluation model gas is set forth in Table 1, and was equivalent to the stoichiometric point. The conversions of the $C_3H_6$ component and the NO component were measured under a steady state at various catalyst bed temperatures, respectively. Note that the definition of the conversion is expressed by the following equation.

Conversion=100×{(Concentration in Inlet Gas)−(Concentration in Outlet Gas)}/(Concentration in Inlet Gas)

TABLE 1

|  | $O_2$ (%) | CO (%) | $C_3H_8$ (%) | NO (%) | $CO_2$ (%) | $H_2O$ (%) | $SO_2$ (ppm) | $N_2$ |
|---|---|---|---|---|---|---|---|---|
| Durability Model Gas | 1.50 | 0.10 | 0.057 | 0.25 | 14.5 | 10 | 50 | Balance |
| Evaluation Model Gas | 0.30 | 0.20 | 0.067 | 0.20 | 14.5 | 10 | None | Balance |

According to the obtained results, the relationships between the catalyst bed temperatures and the conversions were plotted, respectively, and the temperatures were determined at which the conversions were 50%. The results are summarized in Table 2. Note that, in Table 2, "HC-T50" means the 50% conversion temperature for the $C_3H_6$ component, and that "NO-T50" means the 50% conversion temperature for the NO component.

TABLE 2

|  | Composition | HC-T50 (° C.) | NO-T50 (° C.) |
|---|---|---|---|
| Example No. 1 | $Sr_5PtO_7/MgAl_2O_4$ | 305 | 307 |
| Example No. 2 | $Ba_5PtO_7/MgAl_2O_4$ | 299 | 299 |
| Example No. 3 | $Sr_5PtO_7/SrAl_2O_4$ | 307 | 306 |
| Example No. 4 | $Ba_5PtO_7/BaAl_2O_4$ | 299 | 299 |
| Example No. 5 | $Sr_{60}PtO_{62}/MgAl_2O_4$ | 309 | 308 |
| Example No. 6 | $SrPtO_3/MgAl_2O_4$ | 328 | 332 |
| Example No. 7 | $Sr_{90}PtO_{47}/MgAl_2O_4$ | 333 | 338 |
| Example No. 8 | $Ba_{20}PtO_{62}/MgAl_2O_4$ | 296 | 297 |
| Example No. 9 | $Sr_5PtO_7/Sr—Mg—Al_{0.2}/MgAl_2O_4$ | 293 | 295 |
| Example No. 10 | $Ba_5PtO_7/Ba—Mg/MgAl_2O_4$ | 290 | 290 |
| Comp. Ex. No. 1 | $Pt/Al_2O_3$ | 332 | 330 |
| Comp. Ex. No. 2 | $Pt.Rh/Al_2O_3$ | 314 | 307 |
| Comp. Ex. No. 3 | $Pt/MgAl_2O_4$ | 460 | 478 |
| Comp. Ex. No. 4 | $Sr_5PtO_7/Al_2O_3$ | 374 | 394 |
| Comp. Ex. No. 5 | $Sr_5PtO_7/SiO_2$ | 421 | 473 |
| Comp. Ex. No. 6 | $Sr_5PtO_7/ZrO_2$ | 412 | 430 |
| Comp. Ex. No. 7 | $Ba_5PtO_7/Al_2O_3$ | 387 | 416 |

It is apparent from Table 2 that the catalysts of examples were good in terms of the HC and NO purifying activities, and that they were also good in terms of the durability. Moreover, it is understood that the purifying activities after the durability test were furthermore improved in the catalysts, such as Example No. 9 and Example No. 10, in which the composite oxide layers were interposed between the composite oxide supports, having the spinel structure, and the platinum structural layers, and in which the composite oxide layers contained the alkaline-earth metal elements contained in two kinds of the composite oxide supports and the platinum structural layers.

Example No. 6 and Example No. 7 were inferior to the other examples in terms of the purifying activities after the durability test. This phenomenon is believed to have occurred due to the following reasons. The purifying activities were low initially because the Pt contents were excessive or insufficient in the platinum structural layers. The granular growth of the platinum clusters arose in the durability test.

Next, the catalysts of Example No. 2 and Comparative Example No. 1 were observed with a scanning-type electron microscope (TEM) before and after the durability test, thereby analyzing the particle diameter distributions of Pt. The results are shown in FIGS. 2 through 5. Note that the state of the catalyst of Comparative Example No. 1 before the durability test is not shown in the drawings because Pt was dispersed and loaded in an atomic manner so that it was difficult to observe the catalyst with the TEM before the durability test.

Figure 3:
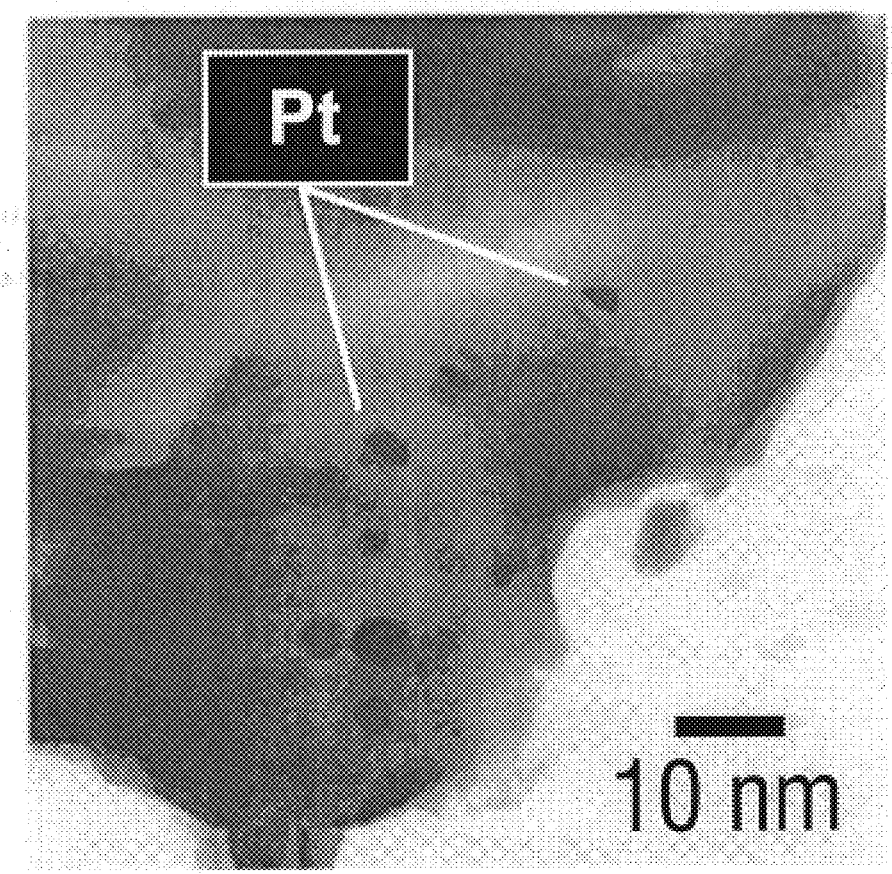
FIG. 3 is an electron microscope photograph for illustrating a particulate arrangement of the catalyst of Example No. 2 after a durability test.
Figure 4:
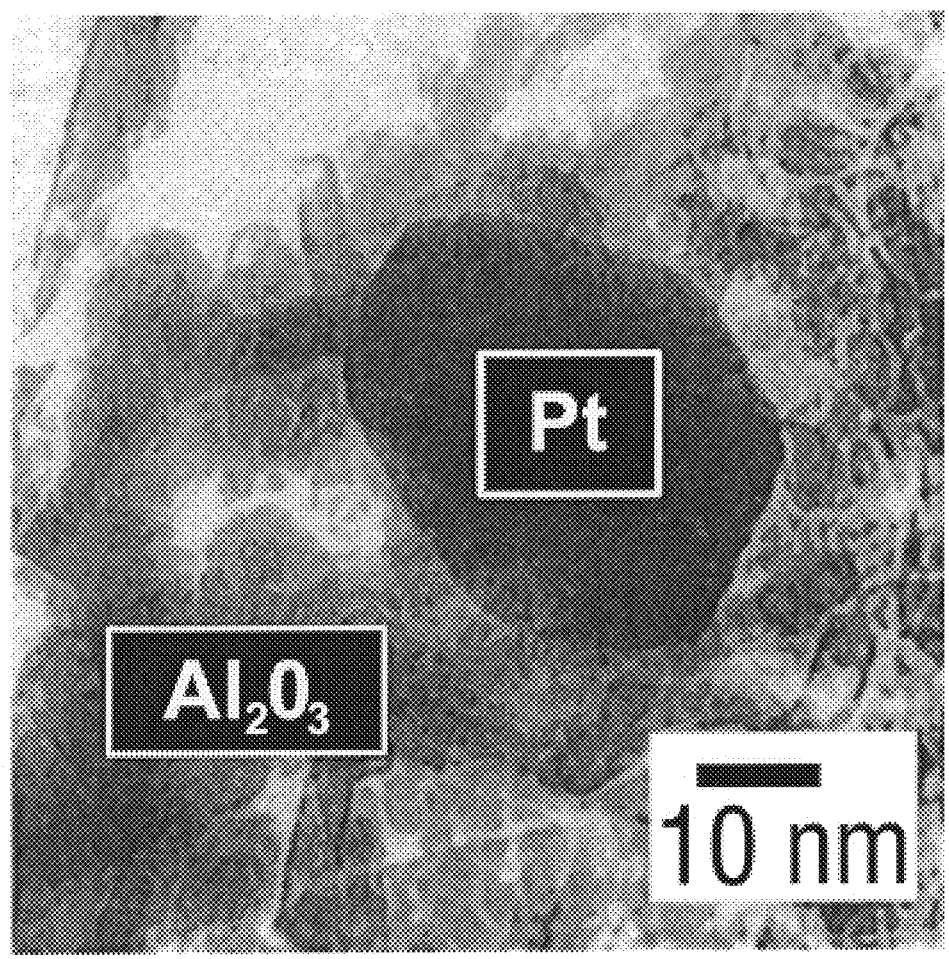
FIG. 4 is an electron microscope photograph for illustrating a particulate arrangement of a catalyst of Comparative Example No. 1 after a durability test.

The following are appreciated from FIGS. 2 through 4. In the catalyst of Comparative Example No. 1, the Pt clusters were coarsened by the durability test to a particle diameter which exceeded 10 nm, and no Pt clusters, which were 10 nm or less, were observed. Whilst, in the catalyst of Example No. 2, the coarsening of the Pt clusters was developed as a whole after the durability test. However, there existed the Pt clusters which were 10 nm or less after the durability test.

Figure 5:
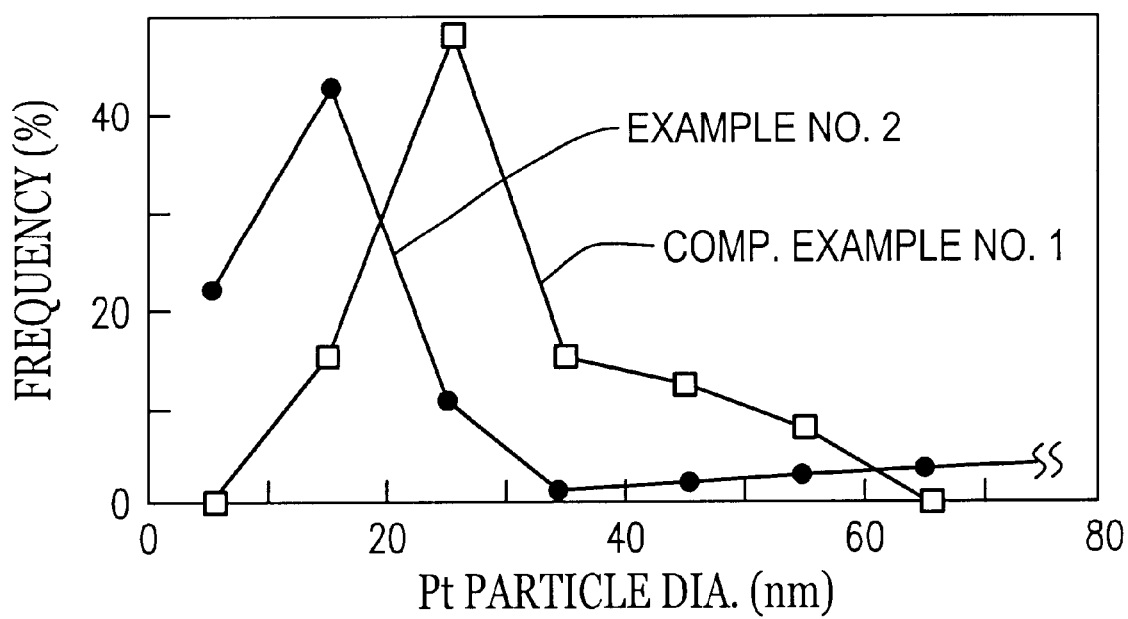
FIG. 5 is a graph for illustrating particle-diameter distributions of the catalysts of Example No. 2 and Comparative Example No. 1 after a durability test.

Moreover, it is seen from FIG. 5 that the catalyst of Example No. 2 exhibited the particle diameter distribution of Pt much finer than that of the catalyst of Comparative Example No. 1.

Namely, it is believed that the catalyst of Example No. 2 exhibited high purifying activities even after the durability test because there existed a large number of the Pt clusters which were 20 nm or less.

In addition, the EDX was carried out in order to analyze the elements in the superficial regions of the catalyst of Example No. 2 after the durability test. Note that the EDX analysis was carried out under the conditions set forth in Table 3.

TABLE 3

| Accelerating Voltage: | 20.00 kV |
|---|---|
| Probe Current: | 0.22 nA |
| BG Point: | 3.63 keV, 8.50 keV |
| Electron Beam Incident Angle: | 90.0 deg. |
| X-ray Take-Out Angle: | 30.0 deg. |
| Measuring Time: | 100 sec. |

As a result, the matrix where the Pt clusters of Example No. 2 were present was found to be $BaSO_4$. Namely, it is apparent that, despite the fact that the matrix of the platinum structural layer was poisoned by sulfur in the durability test, the Pt clusters were inhibited from coarsening. It is believed that this advantage resulted from the arrangement that the composite oxide support having the spinel structure was used.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst for purifying an exhaust gas, comprising:
   a composite oxide support having a spinel structure expressed by $M.Al_2O_4$ in which M is an alkaline-earth metal; and
   a platinum structural layer formed on a surface of said composite oxide support and including a matrix composed mainly of an alkaline-earth metal oxide in which platinum clusters are dispersed uniformly, a particle diameter of said platinum clusters being 10 nm or less.

2. The catalyst according to claim 1, wherein the alkaline-earth metal M is at least one member selected from the group consisting of Mg, Ca, Sr and Ba.

3. The catalyst according to claim 2, wherein the alkaline-earth metal M is at least one member selected from the group consisting of Sr and Ba.

4. The catalyst according to claim 1, wherein the alkaline-earth metal oxide of said platinum structural layer is at least one oxide selected from the group consisting of oxides of Mg, Ca, Sr and Ba.

5. The catalyst according to claim 1, in said platinum structural layer, the ratio of alkaline-earth metal with respect to platinum falls in the range of from 2:1 to 70:1 by a molar ratio.

6. The catalyst according to claim 1, wherein a thickness of said platinum structural layer is 0.05 $\mu$m or less.

7. A catalyst for purifying an exhaust gas, comprising:

a composite oxide support having a spinel structure expressed by $M.Al_2O_4$ in which M is an alkaline-earth metal;

a composite oxide layer formed on a surface of said composite oxide support containing at least two kinds of an alkaline-earth metal comprising the M contained in said composite oxide support and an alkaline-earth metal other than the M; and a platinum structural layer formed on a surface of said composite oxide layer and including a matrix composed mainly of an alkaline-earth metal oxide in which platinum clusters are dispersed uniformly.

8. The catalyst according to claim 7, wherein the alkaline-earth metal other than the M is identical with the alkaline-earth metal of said platinum structural layer.

9. The catalyst according to claim 7, wherein a thickness of said composite oxide layer falls in the range of from 0.02 to 0.1 $\mu$m.

* * * * *